(12) United States Patent
Moodie

(10) Patent No.: US 8,966,127 B2
(45) Date of Patent: Feb. 24, 2015

(54) SHORTCUT FOR ACCESSING CUSTOMER USER DOCUMENTATION

(75) Inventor: Malcolm Moodie, Banbury (GB)

(73) Assignee: Xerox Corporation, Norwalk, CT (US)

( * ) Notice: Subject to any disclaimer, the term of this patent is extended or adjusted under 35 U.S.C. 154(b) by 1902 days.

(21) Appl. No.: 11/851,502

(22) Filed: Sep. 7, 2007

(65) Prior Publication Data

US 2009/0070690 A1    Mar. 12, 2009

(51) Int. Cl.
*G06F 3/00* (2006.01)
*G06F 9/44* (2006.01)
*G06F 3/12* (2006.01)

(52) U.S. Cl.
CPC ............ *G06F 9/4446* (2013.01); *G06F 3/1296* (2013.01)
USPC ............................... 710/8; 715/760; 715/847

(58) Field of Classification Search
USPC ........................ 710/8; 715/760, 847
See application file for complete search history.

(56) References Cited

U.S. PATENT DOCUMENTS

| 6,032,004 | A | | 2/2000 | Mirabella, Jr. et al. |
| 6,112,246 | A | * | 8/2000 | Horbal et al. ................. 709/230 |
| 6,173,320 | B1 | * | 1/2001 | Cunningham ................. 709/220 |
| 6,678,068 | B1 | * | 1/2004 | Richter et al. ............... 358/1.15 |
| 2003/0137688 | A1 | * | 7/2003 | Lawrence et al. ............ 358/1.15 |
| 2003/0172148 | A1 | * | 9/2003 | Simpson et al. ............. 709/224 |
| 2004/0098472 | A1 | * | 5/2004 | Styles et al. ................. 709/221 |
| 2006/0161889 | A1 | | 7/2006 | Stabb et al. |
| 2006/0212497 | A1 | | 9/2006 | Tomita |
| 2006/0294078 | A1 | | 12/2006 | Jang |
| 2007/0180407 | A1 | | 8/2007 | Vahtola |

* cited by examiner

*Primary Examiner* — Henry Tsai
*Assistant Examiner* — John Roche
(74) *Attorney, Agent, or Firm* — Gibb & Riley, LLC

(57) ABSTRACT

In response to a computerized device connecting to a printing device, methods herein create a shortcut on the computerized device when mapping to the printing device. The shortcut comprises a link to device documentation specific to the printing device. After such a link is created, in response to the user activating the shortcut on the computerized device, the methods herein link to the device documentation to cause the device documentation to appear on the graphic user interface of the user's computerized device.

15 Claims, 2 Drawing Sheets

SHORTCUT FOR ACCESSING CUSTOMER USER DOCUMENTATION

BACKGROUND AND SUMMARY

Embodiments herein generally relate to systems, methods, services, etc. for allowing easier and more common access to printing device documentation by automatically providing a shortcut to such documentation that causes the user's computerized device to map to the printing device.

Customer user documentation relating to a printing device (which is sometimes referred to herein as "device documentation") is conventionally provided to the user in printed form, as a compact disc (CD), or as a document accessible over a local or wide area network, such as the Internet. However, most customers are unaware of the device documentation, or misplace the device documentation, and have therefore never viewed it. Those who do refer to the device documentation are usually very positive about its value and see it as a valuable tool. Therefore, one challenge is to increase the pervasiveness of the device documentation.

Embodiments herein are directed toward increasing the accessibility and availability of device documentation available for printers and printing devices by automatically creating a shortcut on the user's computerized device that links directly to the device documentation and by providing the user notice that the shortcut is available and of its potential benefits. Large amounts of money are spent by corporations in creating the device documentation; however, because many users are unaware that the device documentation is available, they resort to call centers or on-site repair personnel, both of which can be expensive. In order to have the resources expended on the device documentation produce benefits of reducing the need for call centers and on-site repair personnel, the user should be made aware of the device documentation and should be provided an easy shortcut that links directly to the device documentation.

With embodiments herein, in response to a computerized device connecting to a printing device, methods herein create a shortcut on the computerized device, when mapping to the printing device. The shortcut comprises a link to device documentation that is specific to the printing device. After such a link is created, in response to the user activating the shortcut on the computerized device, the methods herein link to the device documentation to cause the device documentation to appear on the graphic user interface of the user's computerized device.

In addition, some embodiments herein can provide notice to the user of the availability and function of the shortcut, after it is created, so as to increase the user's awareness of the shortcut and of its usefulness in solving problems (and potentially increasing the user's awareness of features of the printing device). The consumer documentation comprises a guidebook specific to the printing device and comprises information regarding how to use the printing device and how to self-troubleshoot problems with the printing device. The device documentation can be maintained on a print server associated with the printing device that is separate from the computerized device and the device documentation can be in a hypertext markup language (HTML) format.

More specifically, after the computerized device senses a connection with the printing device, the method determines whether the computerized device has been previously mapped to the printing device. If so, the shortcut will have been previously created and necessary drivers will have already been downloaded onto the user's computerized device, so no further action is required as the user's computerized device can easily connect and communicate with the printing device according to the protocols established when the user's computerized device previously connected to the printing device.

However, if the computerized device has not previously been mapped to the printing device, the method embodiments herein automatically map to the printing device and/or load the necessary drivers onto the computerized device to allow the computerized device to communicate with the printing device and also simultaneously create the shortcut, as mentioned above. Thus, with embodiments herein, the creating of the shortcut occurs simultaneously with the mapping and/or loading of the drivers and occurs automatically after the computerized device senses a "new" connection with the printing device (and occurs without user input).

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, embodiments herein provide systems, methods, services, etc. for allowing easier and more common access to printing device documentation by automatically providing a shortcut to such documentation as the user's computerized device connects and maps to the printing device.

Figure 1:
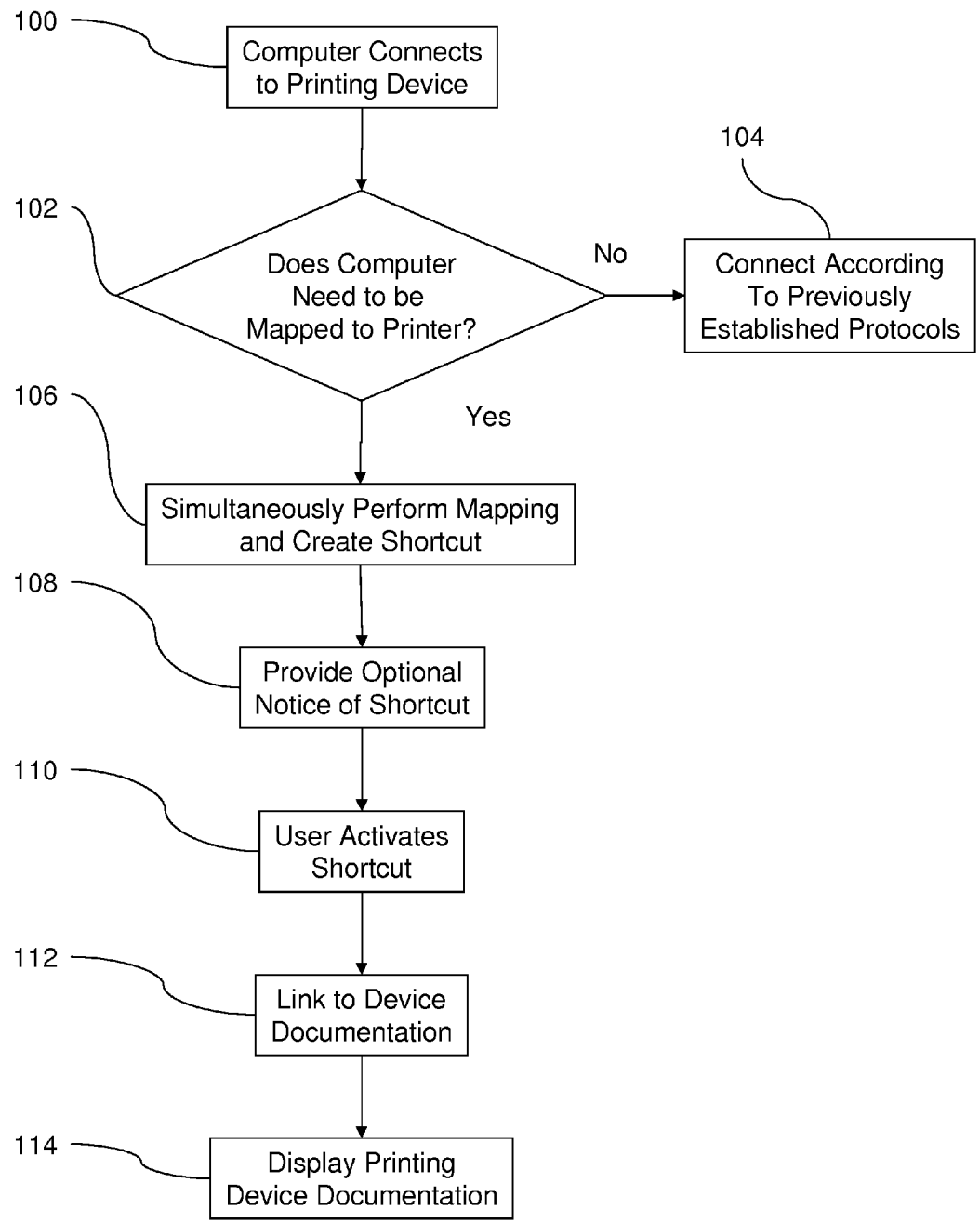
FIG. 1 is a flow diagram illustrating embodiments herein.

As shown in flowchart form in FIG. 1, the methods herein begin their operations in item 100 when the user connects (or attempts to connect) some form of printing device (of any form, including all forms of printers, copiers, multifunction machines, etc.) to their computerized device (of any form, including computers, personal digital assistants (PDAs), cell phones, music players, cameras, portable memory devices, etc.). The "connection" formed in item 100 can comprise a direct wired connection, a wireless connection, a connection over a local area network (LAN) or wide area network (WAN), etc.

Thus, the connection attempted or formed in item 100 can be an actual direct connection or an indirect operative connection. In addition, this connection can be fully manually formed, fully automatically formed, or formed with some automated and some manual steps. For example, the user's computerized device can automatically select the most appropriate printer (based on, for example, the printing device's abilities, location, cost, etc.) and connect automatically, or the computer user can manually select and connect to a given printing device.

Computerized devices and printing devices need to be able to properly communicate with one another to operate correctly. Therefore, it is common to automatically or manually select, provide, and/or download drivers, other communication tools, and routing tools, to determine how the print data from the computerized device will be interpreted and routed so that the printed item will have an appearance consistent with its appearance on the computerized device. Details regarding the use of device drivers and their automated implementation are discussed in conventional literature and the details of such functions are not elaborated upon herein so as to maintain focus on the present embodiments (see U.S. Patent Publication Nos. 2006/0249078 and 2003/0137688, which are fully incorporated herein by reference, for examples of such teachings). The process of downloading these drivers and other communication tools, determining print data routing instructions, etc. is sometimes referred to herein as "mapping" the computerized device to (or with) the printing device.

Such mapping usually occurs automatically and usually only needs to be performed the first time a computerized device connects to a printing device, unless the mapping software, printing device, or the computerized device have been changed since the last time the two were connected. Therefore, in item 102, the methods herein checks to see if the selected printer has been previously mapped to the printing device. If the selected printer has never been mapped to the user's computerized device, or if such mapping has been deleted or corrupted, the printer will need to be mapped to the user's computerized device. Thus, at the start of (or just before) the mapping process and after the computerized device senses a connection with the printing device, the method determines whether the computerized device needs to be so mapped to the printing device in item 102.

If the computerized device has been previously mapped to the printing device, (and no changes have been made to the mapping software or the devices) the shortcut will have previously been created on the computerized device and necessary drivers and routing instructions will have already been downloaded onto the user's computerized device. In such a situation, no further action is required as the user's computerized device can easily connect and communicate with the printing device according to the protocols established when the user's computerized device previously connected to the printing device, and the shortcut will have been previously created as shown in item 104.

However, if it is determined in item 102 that the computerized device has not previously connected to the printing device and/or needs to be mapped (or remapped) to the printing device, the method embodiments herein automatically perform mapping to the printing device to allow the computerized device to communicate with the printing device and also simultaneously create the shortcut, as shown in item 106. The processing details regarding mapping drivers and similar communication and routing instructions are discussed in detail in various pieces of conventional literature (such as U.S. Patent Publication No. 2006/0212497, fully incorporated herein by reference) and the details of such processing are not elaborate upon, so as to maintain focus on the salient points of the embodiments herein. Similarly, the details regarding the automatic creation of shortcuts is also discussed in the conventional literature (such as U.S. Patent Publication Nos. 2007/0180407 and 2006/0161889, fully incorporated herein by reference) and again the details of such processing are not elaborate upon, so as to maintain focus on the salient points of the embodiments herein. Thus, with embodiments herein, the creating of the shortcut occurs simultaneously with the mapping and occurs automatically after the computerized device senses a "new" connection with the printing device (and occurs without user input).

The shortcut resides on the graphic user interface portion of the computerized device (discussed in greater detail below) and comprises a link to device documentation specific to the printing device. The device documentation is usually stored on some form of remote server, such as a print server or database server, but can, at the user's option be stored on the user's computerized device. Therefore, in embodiments herein, the shortcut links to the device documentation that is the most relevant to the specific printing device being mapped to the user's computerized device. Many times, a unique user guide or device documentation is prepared for each model of printing device by the manufacturer of the printing device. Such documentation is specific for that model and is different than device documentation prepared for different models of printing devices and the shortcut links to the most relevant documentations for the specific printing device being mapped.

Thus, if such a specific user guide or device documentation is available, the shortcut links directly to that device documentation. If a given printing device does not have a specific device documentation prepared for it, the shortcut links to the next most relevant device documentation. Therefore, for example, if a specific model of printing device does not have specific (unique) device documentation prepared for it, the shortcut will link to device documentation relating to the sub-class or class of printing devices in which the specific printing device falls. Therefore, with the shortcuts that are automatically created on the user's computerized devices by the embodiments herein, the user is not required to search for and/or locate a specific user guide or device documentation, but instead is linked directly to the most appropriate device documentation (from all related device documentation) for the printing device being mapped to the user's computerized device.

In addition, the shortcut can automatically remove itself from the user's computerized device upon the occurrence of any number of predetermined events to avoid having the user's computerized device become cluttered with large numbers of such shortcuts. For example, the shortcut created in item 106 can automatically remove (delete) itself after a certain period of time has expired (one week, one month, one year, etc.) or after a specific number (e.g., 3, 5, 7, etc.) of additional similar shortcuts have been created on the user's computerized device by embodiments herein.

In addition, as shown in item 108, some embodiments herein can optionally provide notice to the user (on the graphic user interface of the computerized device) of the availability and function of the shortcut after it is created so as to increase the user's awareness of the shortcut and to increase the usefulness of the device documentation in solving problems and potentially increasing the user's awareness of features of the printing device.

The device documentation comprises a guidebook specific to the printing device and comprises information regarding how to use the printing device and how to self-troubleshoot problems with the printing device. The device documentation can be maintained on a print server associated with the printing device (or any other storage device) that is separate from the computerized device (or can be stored on the computerized device) and the device documentation can be in a hypertext markup language (HTML) format, or any other appropriate format.

In response to the user activating the shortcut on the computerized device (item 110) the methods herein link to the device documentation (item 112) to cause the device documentation to appear on the graphic user interface of the user's computerized device (item 114), thus creating a concrete, useful, and tangible result or output.

Figure 2:
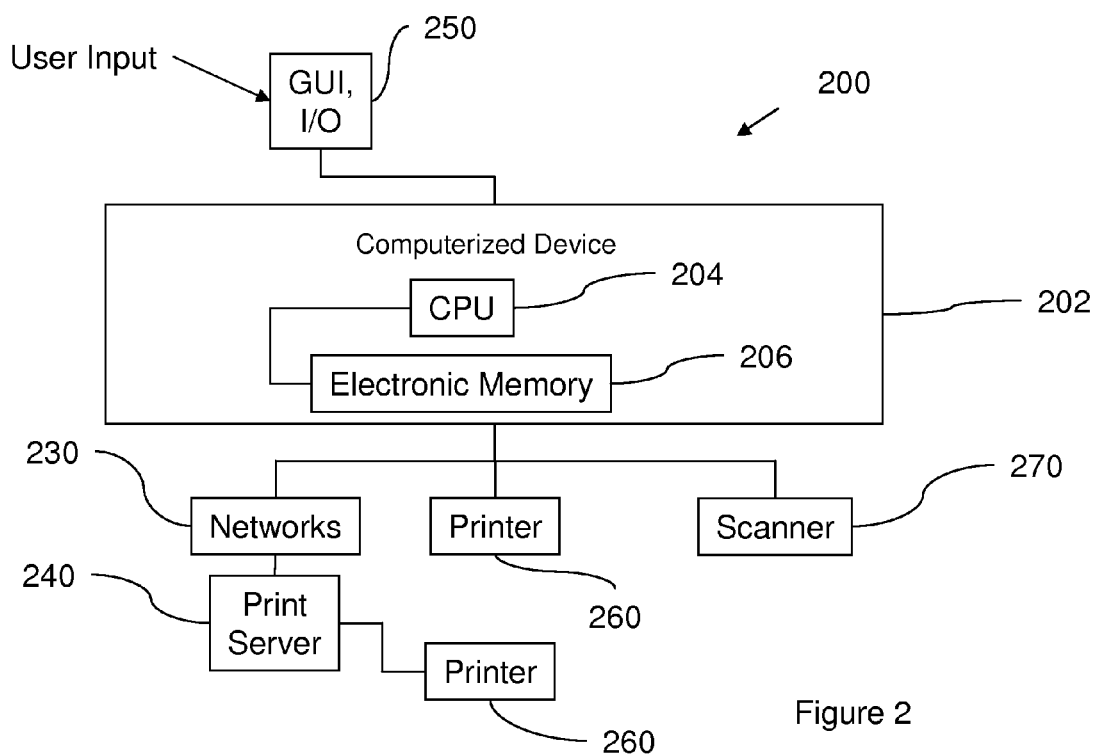
FIG. 2 is a schematic representation of a system embodiment herein.

Another embodiment, shown in FIG. 2, comprises a system embodiment 200 that includes a computerized device 202. The device 202 can comprise any form of computerized device whether now known or developed in the future such as computers, personal digital assistants (PDAs), cell phones, music players, cameras, portable memory devices, personal electronics etc.

The computerized device 202 includes or can be connected to a central processing unit 204 and an electronic memory 206. Further, the computerized device can be connected to or include one or more graphic user interfaces 250, printers 260, scanners 270 or any other integral or peripheral devices. The computerized device can be connected directly to the printer 260 or connected through a print server 240, which can be included within or separate from an external local or wide area network 230.

Computerized devices that include input/output devices, memories, graphic user interfaces, processors, antenna, programmable switches, etc. are readily available devices produced by manufactures such as International Business Machines Corporation, Armonk N.Y., USA and Apple Computer Co., Cupertino Calif., USA. Such chips, antenna, switches, etc. commonly include input/output devices, power supplies, processors, electronic storage memories, wiring, etc., the details of which are omitted herefrom to allow the reader to focus on the salient aspects of the embodiments described herein.

The term printer or printing device as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA. Such printers commonly include input/output, power supplies, processors, media movement devices, marking devices etc., the details of which are omitted herefrom to allow the reader to focus on the salient aspects of the embodiments described herein.

As discussed above, with embodiments herein, in response to the computerized device 202 connecting to a printing device 260, embodiments herein create a shortcut on the graphic user interface 250 of the computerized device 202, when mapping to the printing device 260. The shortcut comprises a link (potentially over the network 230 or to the electronic memory 206) to device documentation that is specific to the printing device 260. After such a link is created, in response to the user activating the shortcut on the computerized device 202, the embodiments herein link to the device documentation to cause the device documentation to appear on the graphic user interface 250 of the user's computerized device 202.

When some new software programs are being installed by a user on their computerized device, the user can be questioned as to whether they desire various shortcuts to be added to their graphic user interface desktop. However, the present embodiments are not readily apparent from such systems because the present embodiments break new ground by automatically providing the shortcut (and optional notice of the same) without any action required by the user, other than forming the initial connection of the printing device (which itself can also be automatic, as discussed above). Additionally, when users connect their computerized devices to a printing device, they only expect the printing device to operate properly, and they do not expect to be provided with guidance on how to operate the printing device. Thus, with the present embodiments, the user is provided with unexpected quick, single click access to the user's guide (device documentation) for the specific printer to which they are connected, without any effort, searching, or other action required on behalf of the user, which is a surprisingly pleasant and unexpected result of simply connecting a printing device to a computerized device.

Further, because the printing device mapping process is usually fully automated, the present embodiments are fundamentally different than situations where the user is installing a new item of software. When the mapping process to a new printing device is being performed, most users are unaware of the installation of drivers and do not consider that a "new item" of software or a "new" program is being installed on their computerized device. Therefore, it would not conventionally occur to users that any shortcuts should be created when they are simply connecting to a printing device because, in most users' minds, no new software is being installed. Instead, most users only begin to look for the user guide or device documentation when they are encountering difficulty in activating features of the printing device, or are encountering errors in operating the printing device. It is only at this later time (well after the mapping process has been completed) that users begin searching for the device documentation. Therefore, there is no conventional motivation for creating shortcuts to device documentation along with the printing device mapping process, because it would not occur to users that they need the device documentation until a later time and because users are only accustomed to creating shortcuts when new software programs are installed.

Thus, as shown above, the embodiments herein are directed toward increasing the accessibility and availability of device documentation that is available for printers and printing devices by automatically creating a shortcut on the user's computerized device that links directly to the device documentation and by providing the user notice that the shortcut is available and of its potential benefits. As noted above, large amounts of money are spent by corporations in creating the device documentation; however, because many users are unaware that the device documentation is available or are unaware how to access such device documentation, they resort to call centers or on-site repair personnel, both of which can be expensive. In order to have the resources expended on the device documentation produce benefits of reducing the need for call centers and on-site repair personnel, the embodiments herein make the user aware of the device documentation and provide an easy shortcut that links directly to the device documentation.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
    in response to a computerized device connecting to a printing device, automatically mapping said printing device to said computerized device and simultaneously automatically creating a shortcut on said computerized device, wherein said shortcut comprises a link to device documentation specific to said printing device, wherein said mapping comprises: after said computerized device senses a connection with said printing device, automatically determining whether said computerized device needs to be mapped to said printing device; and if said computerized device needs to be mapped to said printing device, automatically loading drivers onto said computerized device to allow said computerized device to communicate with said printing device; and in response to a user activating said shortcut on said computerized device, automatically linking to said device documentation to cause said device documentation to appear on a graphic user interface of said computerized device, wherein said device documentation is maintained on a server separate from said computerized device.

2. The method according to claim 1, wherein said creating of said shortcut occurs simultaneously with said loading of said drivers.

3. The method according to claim 1, wherein said creating of said shortcut occurs automatically after said computerized device senses a connection with said printing device and occurs without user input.

4. The method according to claim 1, further comprising providing notice to said user of an availability and function of said shortcut.

5. The method according to claim 1, wherein said device documentation comprises a guidebook specific to said printing device and comprises information regarding how to use said printing device and how to self-troubleshoot problems with said printing device.

6. The method according to claim 1, wherein said computerized device and said printing device are adapted to automatically establish communications with each other.

7. A method comprising:
in response to a computerized device mapping to a printing device, automatically creating a shortcut on said computerized device, wherein said shortcut comprises a link to device documentation specific to said printing device, wherein said mapping comprises: after said computerized device senses a connection with said printing device, automatically determining whether said computerized device needs to be mapped to said printing device; and if said computerized device needs to be mapped to said printing device, automatically loading drivers onto said computerized device to allow said computerized device to communicate with said printing device, wherein said creating of said shortcut occurs simultaneously with said loading of said drivers; and in response to a user activating said shortcut on said computerized device, automatically linking to said device documentation to cause said device documentation to appear on a graphic user interface of said computerized device, wherein said device documentation is maintained on a print server associated with said printing device that is separate from said computerized device.

8. The method according to claim 7, wherein said creating of said shortcut occurs automatically after said computerized device senses a connection with said printing device and occurs without user input.

9. The method according to claim 7, further comprising providing notice to said user of an availability and function of said shortcut.

10. The method according to claim 7, wherein said device documentation comprises a guidebook specific to said printing device and comprises information regarding how to use said printing device and how to self-troubleshoot problems with said printing device.

11. The method according to claim 7, wherein said printing device comprises any form of electrostatographic or xerographic device.

12. A computer-readable non-transitory storage medium maintaining
a program of instructions executable by said computer that cause said computer to perform a method comprising:
in response to a computerized device mapping to a printing device, automatically creating a shortcut on said computerized device, wherein said shortcut comprises a link to device documentation specific to said printing device, wherein said mapping comprises: after said computerized device senses a connection with said printing device, automatically determining whether said computerized device needs to be mapped to said printing device; and if said computerized device needs to be mapped to said printing device, automatically loading drivers onto said computerized device to allow said computerized device to communicate with said printing device, wherein said creating of said shortcut occurs simultaneously with said loading of said drivers; and in response to a user activating said shortcut on said computerized device, automatically linking to said device documentation to cause said device documentation to appear on a graphic user interface of said computerized device, wherein said device documentation is maintained on a print server associated with said printing device that is separate from said computerized device.

13. The computer-readable non-transitory storage medium according to claim 12, wherein said creating of said shortcut occurs automatically after said computerized device senses a connection with said printing device and occurs without user input.

14. The computer-readable non-transitory storage medium according to claim 12, further comprising providing notice to said user of an availability and function of said shortcut.

15. The computer-readable non-transitory storage medium according to claim 12, wherein said device documentation comprises a guidebook specific to said printing device and comprises information regarding how to use said printing device and how to self-troubleshoot problems with said printing device.

* * * * *